United States Patent
Yang

(10) Patent No.: US 7,253,870 B2
(45) Date of Patent: Aug. 7, 2007

(54) LIQUID CRYSTAL DISPLAY HAVING A BIMETAL LAYER ALLOWING THE FIRST SUBSTRATE TO SELECTIVELY MAKE CONTACT WITH THE ITO LAYER

(75) Inventor: Suk Man Yang, Seoul (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 254 days.

(21) Appl. No.: 10/951,523

(22) Filed: Sep. 28, 2004

(65) Prior Publication Data

US 2005/0168675 A1  Aug. 4, 2005

(30) Foreign Application Priority Data

Feb. 4, 2004  (KR)  .................. 10-2004-0007292

(51) Int. Cl.
*G02F 1/1333* (2006.01)
(52) U.S. Cl. .................. 349/161; 349/122; 349/147; 349/148
(58) Field of Classification Search .............. 349/122, 349/111, 147, 148
See application file for complete search history.

(56) References Cited

U.S. PATENT DOCUMENTS

2006/0072054 A1* 4/2006 Ito ........................... 349/96

FOREIGN PATENT DOCUMENTS

KR  2002 0014993  2/2002

* cited by examiner

*Primary Examiner*—Andrew Schechter
*Assistant Examiner*—Lucy Chien
(74) *Attorney, Agent, or Firm*—Ladas & Parry LLP

(57) ABSTRACT

Disclosed is a liquid crystal display capable of obtaining a high-quality image without creating flicker and ghost image phenomenon even if Vcom is adjusted, by minimizing variation of refractive index and dielectric constant depending on a temperature through maintaining a liquid crystal layer at a constant temperature. The liquid crystal display comprises a first substrate, a second substrate disposed opposite to the first substrate, an overcoat layer formed on the second substrate, a black matrix layer of a matrix shape formed on the overcoat layer, an ITO layer formed on the black matrix layer, a metal layer formed on the ITO layer, which is formed on the black matrix layer, and a liquid crystal layer interposed between the first substrate and the second substrate.

5 Claims, 3 Drawing Sheets

LIQUID CRYSTAL DISPLAY HAVING A BIMETAL LAYER ALLOWING THE FIRST SUBSTRATE TO SELECTIVELY MAKE CONTACT WITH THE ITO LAYER

BACKGROUND OF THE INVENTION

1. Field of the Invention

The present invention relates to a liquid crystal display, and more particularly to a liquid crystal display capable of displaying a high-quality image by removing flicker and ghost images.

2. Description of the Prior Art

As generally known in the art, since a liquid crystal display (hereinafter, referred to as "LCD") has characteristics of being lightweight, slim in shape, and having a low consumption of power, such LCDs are used for various information devices, video apparatuses, etc., instead of CRTs (Cathode Ray Tubes). Particularly, since a thin film transistor liquid crystal display (hereinafter, referred to as "TFT-LCD") including TFTs (Thin Film Transistors) has an excellent response characteristic and is suitable for numbers of pixels, such a TFT-LCD can realize a high-quality and large screen display.

Meanwhile, a TFT-LCD had a disadvantage in that its viewing angle is narrow resulting from the employment of a TN (Twisted Nematic) mode, but this narrow viewing angle problem has been solved to some degree by transverse electric-field type LCDs, such as an in-plane-switching LCD (hereinafter, referred to as "IPS-LCD") and a fringe-field-switching LCD (hereinafter, referred to as "FFS-LCD"). Herein, the FFS-LCD may solve disadvantages of the IPS-LCD, such as a low aperture ratio and a low permeability.

Different from a plasma display panel and a field emission display, the above-mentioned LCDs have a non-emission characteristic, so it cannot be used in an area in which light is not provided. Therefore, each of these LCDs has a backlight installed at a lower portion thereof, thereby displaying a screen with light emitted from the backlight.

A conventional liquid crystal display will be now explained with reference to the accompanying drawings.

FIG. 1 is a sectional view illustrating a conventional FFS-LCD panel, and FIG. 2 is a plan view for explaining temperature distribution for each portion of a liquid crystal layer according to the location of a backlight in the FFS-LCD shown in FIG. 1.

As shown in FIG. 1, the FFS-LCD includes a lower panel 1, an upper panel 3, and a liquid crystal layer 5 filled between the lower panel 1 and the upper panel 3.

Although it is not shown, the FFS-LCD further includes a backlight and a lower polarization plate for polarizing and transmitting the light of the backlight to the lower panel 1. The lower panel 1 transmits an electric signal to the liquid crystal layer 5, and then the liquid crystal layer 5 transmits the light to the upper panel 3 while controlling the amount of light according to the electric signal transmitted from the low panel 1.

For reference, an RGB color filter layer is formed on the upper panel 3. In addition, an ITO layer 7, which is a transparent electrode layer, is formed on the RGB color filter layer in order to prevent electrostatic discharge (ESC). In FIG. 1, reference numeral '9' represents an overcoat layer.

In the conventional FFS-LCD, when light is outputted from the backlight, the light arrives at the upper panel 3 via the lower panel 1 and the liquid crystal layer 5, so that an image having various colors is displayed. Herein, in order to display a high-quality image, a uniform image quality must be maintained over the entire face of the upper panel.

However, with the conventional FFS-LCD, as shown in FIG. 2, since the backlight is located at an edge of a panel, a portion adjacent to the backlight has relatively higher temperature as compared with a portion away from the backlight.

Usually, a liquid crystal molecule represents different property in long-axis and short-axis directions thereof, respectively, and has different refractive index ($\Delta n$) and dielectric constant ($\epsilon$) in the long-axis and short-axis directions, respectively, so that it can be understood that liquid crystal has a very high dependency on a temperature.

For reference, FIG. 3 is a graph for showing temperature dependence of the refractive index ($\Delta n$) of liquid crystal, and FIG. 4 is a graph for showing temperature dependence of the dielectric constant ($\epsilon$) of liquid crystal.

As shown in FIGS. 3 and 4, when the liquid crystal layer has different temperature values according to portions thereof, the refractive index ($\Delta n$) and the dielectric constant ($\epsilon$) change, so that a capacitance value of the liquid crystal varies. Consequently, when the upper panel displays a screen, flicker and ghost images occur, thereby deteriorating image quality.

Moreover, since a portion of the liquid crystal layer adjacent to the backlight has a higher temperature than a portion of the liquid crystal layer away from the backlight, image quality is deteriorated even more.

In the following description, the phenomenon of deterioration of image quality according to temperature variation in the liquid crystal layer will be explained in more detail.

FIG. 5 is a view explaining a waveform of a pixel of a conventional liquid crystal display in a frame inversion-drive mode. In the liquid crystal display, when a signal is applied from a gate driver IC, a data signal is inputted from a data driver IC, so that a voltage is supplied to a pixel.

Herein, the operation for one frame is performed for 60 Hz, which means that a gate signal is applied to a thin film transistor, which is a kind of switching device, after 16.7 ms. Therefore, electric charges must be maintained for 16.7 ms without being leaked, until the next signal is applied. Such a function for reserving the electric charge is carried out by a capacitor.

As shown in FIG. 5, during an ON status of a gate voltage of a TFT, a signal applied to a data electrode thereof through a signal line is applied to a liquid crystal capacitor and a storage capacitor through a source electrode of the TFT. Such a status is continuously maintained even after a voltage of the signal applied with a gate pulse is OFF. However, owing to a capacitance between the gate electrode and the source electrode of the TFT, a voltage shift of a pixel voltage occurs by a $\Delta Vp$, in which the $\Delta Vp$ is calculated as the following equation:

Equation $$\Delta Vp = \frac{Cgs}{Csg + Clc + Cst} \Delta Vg$$

Wherein, Cgs represents a capacitance between a gate electrode and a source electrode, and Clc represents a capacitance of a liquid crystal.

Herein, a positive $\Delta Vp$ leaking from the capacitor when a data signal is positive, that is, when a data signal has a high voltage, must be identical to a negative $\Delta Vp$ leaking from the capacitor when a data signal is negative, that is, when a data signal has a low voltage.

When the positive ΔVp and the negative ΔVp are different from each other, a flicker phenomenon (shaking of an image) and ghost images may be caused, deteriorating image quality. Therefore, in order to solve the flicker phenomenon, an area of the positive ΔVp is formed identical to an area of the negative ΔVp by adjusting Vcom applied to a common electrode.

However, when the center of a screen is set as a basis during the adjustment of the Vcom, the area of the positive ΔVp and the area of the negative ΔVp are not equal to each other in the vicinity of the backlight, so that the above-mentioned problems occur. While the Cgs and the Cst can be controlled during a lower panel design, there is a problem in that it is difficult to control the capacitance Clc of the liquid crystal because the refractive index and dielectric constant of the liquid crystal vary according to temperature as described above.

Such a phenomenon appears because a capacitance of a portion of the liquid crystal layer adjacent to the backlight and a capacitance of a portion of the liquid crystal layer away from the backlight have different values from each other due to increase of temperature in the vicinity of the backlight.

SUMMARY OF THE INVENTION

Accordingly, the present invention has been made to solve the above-mentioned problems occurring in the prior art, and an object of the present invention is to provide a liquid crystal display capable of obtaining a high-quality image without creating flicker and ghost image phenomenon even if Vcom is adjusted, by minimizing variation of refractive index and dielectric constant depending on a temperature through maintaining a liquid crystal layer at a constant temperature.

In order to accomplish this object, there is provided a liquid crystal display comprising: a first substrate; a second substrate disposed opposite to the first substrate; an overcoat layer formed on the second substrate; a black matrix layer of a matrix shape formed on the overcoat layer; an ITO layer formed on the black matrix layer; a metal layer formed on the ITO layer, which is formed on the black matrix layer; and a liquid crystal layer interposed between the first substrate and the second substrate.

Herein, it is preferred that the metal layer includes a material having a high electric conductivity, wherein the material having a high electric conductivity includes MoW or Al—Nd.

In addition, it is still preferred that the metal layer is aligned below the black matrix layer so as to prevent the metal layer from influencing on permeability.

In addition, it is still preferred that a bimetal layer allowing the first substrate to selectively make contact with the ITO layer is formed on the metal layer, which electrically connects the ITO layer to the first substrate. Herein, the bimetal layer includes a first alloy layer and a second alloy layer adhering to each other, in which the first alloy layer includes a copper-zinc alloy and the second alloy includes a nickel-iron alloy.

Such a bimetal layer is formed in order to maintain the ITO layer at a constant temperature. That is, when a voltage is applied to the ITO layer, the bimetal layer is maintained at a horizontal state until temperature arrives at a predetermined value, and then the bimetal layer curves when the temperature exceeds the predetermined value, so that the contact between the thin film transistors and the ITO layer is broken and then the temperature decreases. Through the repetition of such operations, the temperature of the ITO layer is maintained at a constant value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
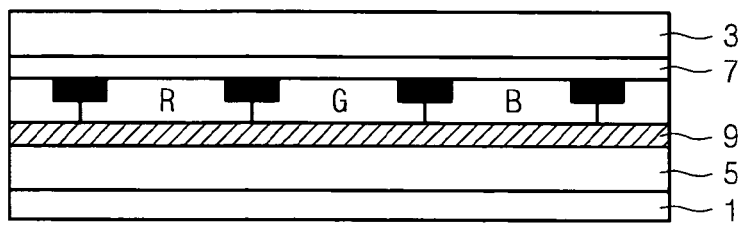
FIG. 1 is a sectional view illustrating a conventional FFS-LCD panel.
Figure 2:
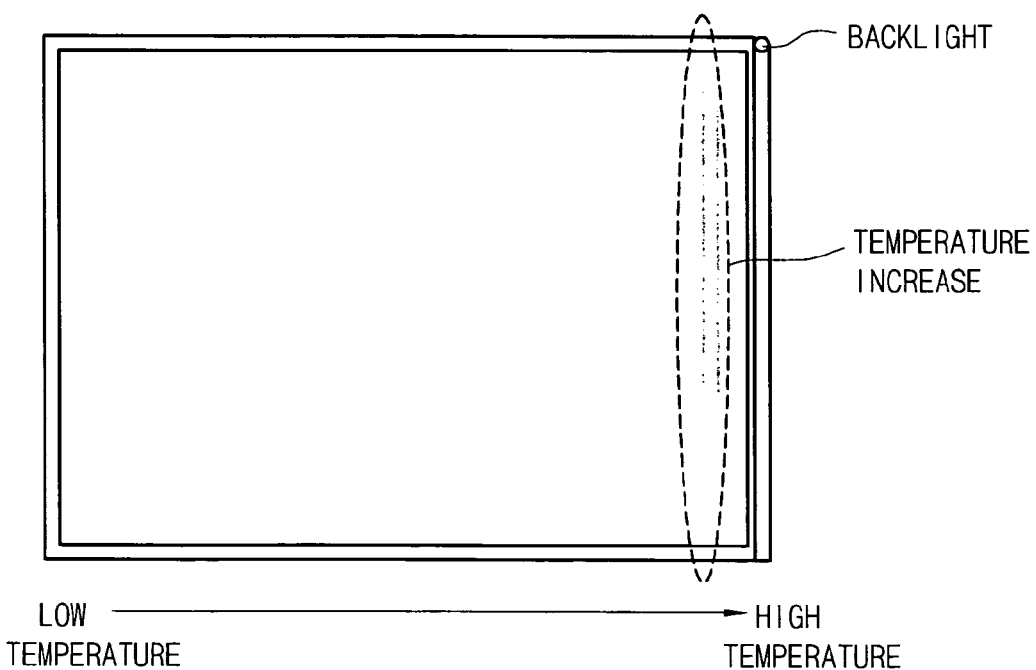
FIG. 2 is a plan view for explaining temperature distribution for each portion of a liquid crystal layer according to the location of a backlight in the FFS-LCD shown in FIG. 1.
Figure 3:
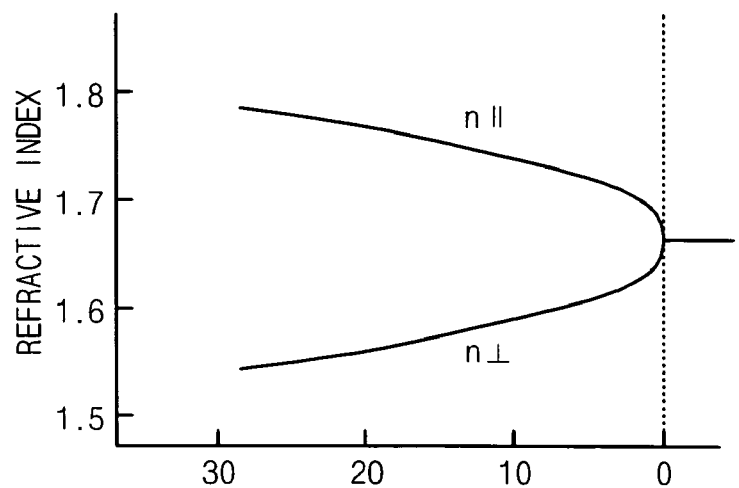
FIG. 3 is a graph for showing temperature dependence of the refractive index of liquid crystal.
Figure 4:
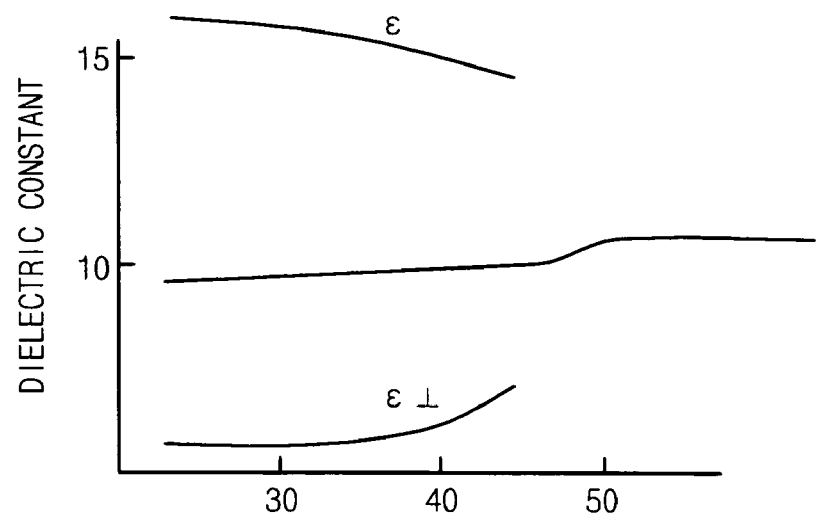
FIG. 4 is a graph for showing temperature dependence of the dielectric constant of liquid crystal.
Figure 5:
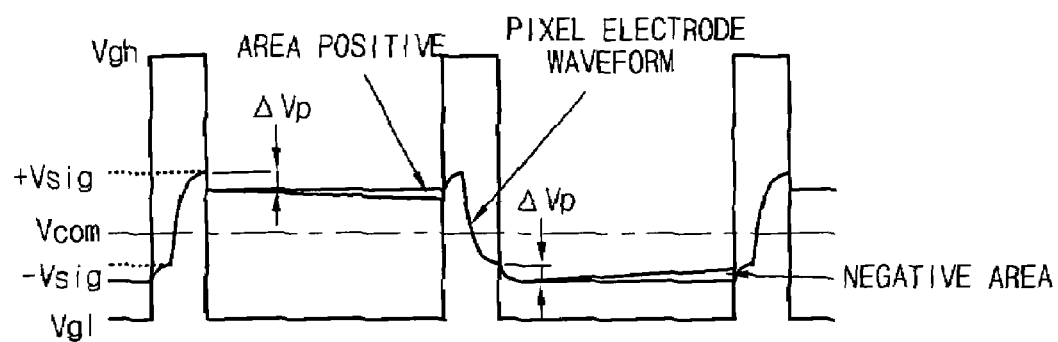
FIG. 5 is a view explaining a waveform of a pixel of a conventional liquid crystal display in a frame inversion-drive mode.

Hereinafter, a preferred embodiment of the present invention will be described with reference to the accompanying drawings. In the following description and drawings, the same reference numerals are used to designate the same or similar components, and so repetition of the description on the same or similar components will be omitted.

A liquid crystal display according to the present invention has a characteristic that minimizes refractive index and dielectric constant variations caused by temperature change by maintaining a liquid crystal layer at a constant temperature.

When the liquid crystal layer is maintained at a constant temperature, the Clc is maintained at a constant value, so that a positive ΔVp and a negative ΔVp have the same area with each other even if Vcom is adjusted on the basis of any portion of a panel, thereby removing flicker and ghost image phenomenon.

In addition, when the temperature of the whole panel is maintained on the basis of the temperature of a backlight, a viscosity is reduced due to increased temperature, thereby providing a faster response speed.

In addition, since a metal layer is deposited on a black matrix in order to maintain the liquid crystal layer at a constant temperature, a dark state and a white state are improved in displayed images, and thus the improvement of contrast is expected.

The liquid crystal display of the present invention will now be explained in more detail.

The liquid crystal display of the present invention includes a first substrate, a second substrate disposed opposite to the first substrate, a liquid crystal layer interposed between the first substrate and the second substrate, an ITO layer formed below the second substrate, and a metal layer formed on the ITO layer, in which the metal layer maintains the liquid crystal layer at a constant temperature.

Figure 6:
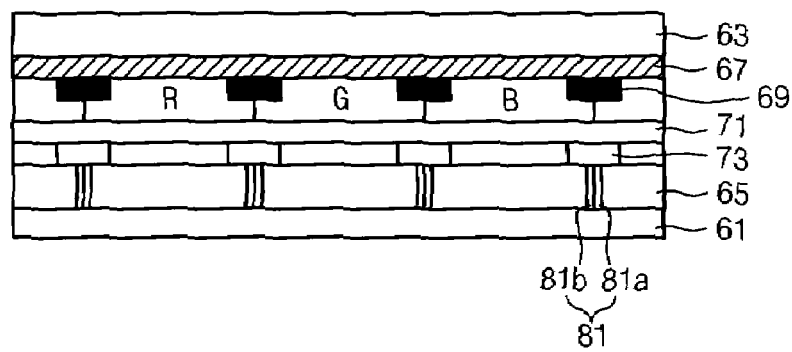
FIG. 6 is a sectional view illustrating a liquid crystal display according to an embodiment of the present invention.

A sectional view of such a liquid crystal display of the present invention is shown in FIG. 6.

As shown in FIG. 6, a liquid crystal layer 65 is formed between a first substrate 61 and a second substrate 63, an overcoat layer 67 is formed on the entire surface of the second substrate 63, and a block matrix layer 69 of a matrix shape is formed on the overcoat layer 67.

In addition, an RGB color filter layer is formed in each space of the black matrix layer 69, and an ITO layer 71 is formed on the RGB color filter layer.

In addition, a metal layer 73 is formed on the ITO layer 71 in order to maintain the liquid crystal layer 65 at a constant temperature. Herein, the metal layer 73 is formed to overlap with the black matrix layer 69 so as to prevent the metal layer from influencing on permeability.

It is preferred that the metal layer 73 is made from materials of MOW, Al—Nd, etc.

The reason of forming the metal layer 73 with such materials is that such materials have a large resistance, an excellent chemical immunity, and excellent thermal stability. If a metal having poor chemical immunity or poor thermal stability is used, the metal layer 73 is transformed, thus trespassing into opening regions, so that permeability may be reduced.

When the metal layer 73 is deposited on the ITO layer 71 in such a manner that the metal layer 73 overlaps with the black matrix layer 69, which is formed at the second substrate 63 so as to block light. By such a construction, it is possible to prevent the metal layer 73 from influencing pixel regions (R, G, and B), which correspond to opening regions for transmitting light, thereby preventing the metal layer from influencing on permeability.

When voltage is applied to maintain a constant temperature, thin film transistors are dotted onto the first substrate in the same manner as the twisted nematic (NT) mode, in order to apply the voltage to the ITO layer formed at the second substrate.

However, since the temperature of the ITO layer 71, on which the metal layer 73 is deposited, is continuously increased if a voltage is continuously applied, a means for controlling such a phenomenon is needed. To this end, a bimetal layer 81, which includes a first alloy layer 81a and a second alloy layer 82b adhering to each other, is formed on the metal layer, which is contact with the ITO layer contacted with the thin film transistors. In this case, it is preferred that the first alloy 81a is made from copper-zinc alloy and the second alloy 81b is made from nickel-iron alloy.

Figure 7:
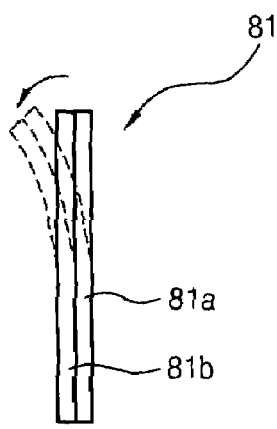
FIG. 7 is a view for explaining a bimetal layer which connects thin film transistors of a first substrate and an ITO layer of a second substrate in a liquid crystal display according to an embodiment of the present invention.

As shown in FIG. 7, according to the operation principle of the bimetal layer 81, when two metals having different expansion coefficients are contacted with each other, the two metals are maintained in a horizontal state while temperature increase till a predetermined value, but the two metals curve when temperature exceeds the predetermined value.

That is, according to such a principle, when a voltage is applied to the first substrate, the applied voltage carries through the ITO layer formed at the second substrate via thin film transistors. At this time, while the voltage is continuously applied until temperature arrives at a predetermined value, the bimetal layer 81 formed at the ITO layer curves when the temperature exceeds the predetermined value, so that the contact between the thin film transistors and the bimetal layer 81 is broken.

After this, when the temperature decreases, the bimetal layer 81 returns to a horizontal state, so that the thin film transistors and the bimetal layer 81 are again contacted and the temperature increases.

Through the repeating of such an operation, the ITO layer 71 may be always maintained at a uniform temperature, and consequently, the temperature of a cell is also maintained at a constant value.

As described above, the liquid crystal display of the present invention has effects as follows.

First, it is possible to minimize refractive index and dielectric constant variations caused by temperature change.

Secondly, since the positive ΔVp and the negative ΔVp have the same area by maintaining the liquid crystal layer at a constant temperature, the positive ΔVp and the negative ΔVp have the same area with each other even if Vcom is adjusted on the basis of any portion of a panel, thereby removing flicker and ghost image phenomenon.

Thirdly, since the temperature of the whole panel is maintained on the basis of the temperature of a backlight, a viscosity is reduced due to increased temperature, thereby providing a faster response speed.

Fourthly, since a metal layer is deposited on a black matrix in order to maintain the liquid crystal layer at a constant temperature, a dark state and a white state are improved in displayed images, thereby obtaining improved contrast.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:
   a first substrate;
   a second substrate disposed opposite to the first substrate;
   an overcoat layer formed on the second substrate;
   a black matrix layer of a matrix shape formed on the overcoat layer;
   an ITO layer formed on the black matrix layer;
   a metal layer formed on the ITO layer, which is formed on the black matrix layer; and
   a liquid crystal layer interposed between the first substrate and the second substrate,
   wherein a bimetal layer allowing the first substrate to selectively make contact with the ITO layer is formed on the metal layer, which electrically connects the ITO layer to the first substrate.

2. The liquid crystal display as claimed in claim 1, wherein the metal layer includes a material having a high electric conductivity.

3. The liquid crystal display as claimed in claim 2, wherein the material having a high electric conductivity includes MoW or Al—Nd.

4. The liquid crystal display as claimed in claim 1, wherein the metal layer is aligned below the black matrix layer.

5. The liquid crystal display as claimed in claim 1, wherein the bimetal layer includes a first alloy layer and a second alloy layer adhering to each other, in which the first alloy layer includes a copper-zinc alloy and the second alloy includes a nickel-iron alloy.

* * * * *